(12) United States Patent
Oroskar

(10) Patent No.: US 8,768,310 B1
(45) Date of Patent: Jul. 1, 2014

(54) PROVIDING A NOTIFICATION MESSAGE

(75) Inventor: Siddharth Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 131 days.

(21) Appl. No.: 13/553,436

(22) Filed: Jul. 19, 2012

(51) Int. Cl.
*H04W 68/00* (2009.01)
*H04M 1/663* (2006.01)
*H04M 1/725* (2006.01)

(52) U.S. Cl.
USPC ........................................ 455/412.2; 455/458

(58) Field of Classification Search
CPC ... H04W 68/00; H04W 68/005; H04W 68/02; H04W 68/04; H04W 68/10; H04W 52/00; H04W 52/0212; H04W 52/0258; H04W 52/28; H04W 52/386

USPC .......... 455/127.1, 127.5, 343.1, 343.2, 343.3, 455/412.1, 412.2, 413, 415, 458, 515, 574; 370/310, 311, 312, 389
See application file for complete search history.

(56) References Cited

U.S. PATENT DOCUMENTS

| | | | | |
|---|---|---|---|---|
| 6,088,589 | A * | 7/2000 | Valentine et al. | 455/433 |
| 8,000,684 | B1 | 8/2011 | Bhan et al. | |
| 2005/0181767 | A1* | 8/2005 | Boland et al. | 455/412.2 |
| 2008/0225760 | A1* | 9/2008 | Iyer et al. | 370/310 |
| 2009/0082041 | A1* | 3/2009 | Ranganathan et al. | 455/458 |

* cited by examiner

*Primary Examiner* — San Htun
*Assistant Examiner* — Erica Navar

(57) ABSTRACT

In systems and methods of providing a notification message in a wireless communication system, a message notifier is received at a processing node in wireless communication system based on a first message from a sender. The message notifier comprises sender information. The sender information is matched to a contact entry of the recipient to generate a matching criteria. Based on the matching criteria a paging channel power is determined for a notification message to be sent to the recipient wireless device.

15 Claims, 6 Drawing Sheets

PROVIDING A NOTIFICATION MESSAGE

TECHNICAL BACKGROUND

Communication networks can facilitate point-to-point telephony between network endpoints. However, even in an age of widely available communication capability, including wireless communication networks, a phone call may not be answered. For example, the target device may be disconnected from a communication network, either because the device is out of range of the communication network, or because the device is turned off, and thus the target device does not signal the incoming call to a user. In addition, a user may choose not to answer an incoming call. In such cases, many communication networks provide the initiator of the call an opportunity to leave a recorded voice message, often referred to as voice mail, for the user of the target device.

Typically, a voice mail left by a caller is received at a processing node in the communication network (one example of which is a voice mail server). The processing node can send a notification message to the target device that voice mail has been received for the target device. Typically, the notification message is sent with a fixed transmission power.

Overview

In operation, a message notifier is received at a processing node in wireless communication system based on a first message from a sender. The message notifier comprises sender information. The sender information is matched to a contact entry of the recipient to generate a matching criteria. Based on the matching criteria a paging channel power is determined for a notification message to be sent to the recipient wireless device.

DETAILED DESCRIPTION

Figure 1:
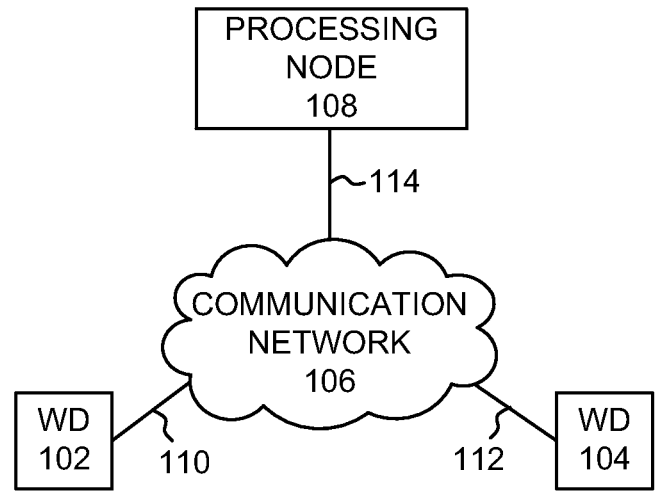
FIG. 1 illustrates an exemplary system for providing a notification message in a wireless communication system.

FIG. 1 illustrates an exemplary communication system 100 to provide a notification message comprising wireless devices 102 and 104, communication network 106, and processing node 108. Examples of wireless devices 102 and 104 can include a cell phone, a smart phone, a computing platform such as a laptop, palmtop, or tablet, a personal digital assistant, or an internet access device, including combinations thereof. Wireless device 102 and 104 are in communication with communication network 106 over communication links 110 and 112, respectively.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication network 106 is in communication with processing node 108 over communication link 114. Processing node 108 is a network element capable of providing a notification message, for example, intended for wireless device 102, 104, as further described below. Processing node 108 can comprise, for example, a dedicated network node, or the functionality of location processing node 108 can be included in another network node such as a gateway, a proxy node, a home location register (HLS), a home subscriber server (HSS), a mobility management entity (MME), or other network node capable of supporting the appropriate functionality.

Communication links 110, 112 and 114 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between communication network 106 and processing node 108 which are omitted for clarity, including additional processing nodes, routers, gateways, and physical and/or wireless data links for carrying data among the various network elements.

In operation, a message notifier is received at processing node 108 in wireless communication system 100 based on a first message from a sender (such as wireless device 102) to a recipient wireless device (such as wireless device 104). The message notifier comprises sender information. The sender information is matched to a contact entry of the recipient 104 to generate a matching criteria. Based on the matching criteria a paging channel power is determined for a notification message to be sent to the recipient wireless device 104.

In an embodiment, the message notifier further comprises chronological information. The sender information can be located in a received message history of the recipient 104 to generate a message history criteria, and the chronological information can be compared to a first time period to generate a chronological criteria. Further, based on the message history of the recipient and a second time period, a frequency metric can be generated. A paging channel power for a notification message to be sent to the recipient wireless device 104 can be determined based on at least one of the matching criteria, the message history criteria, the chronological criteria, and the frequency metric.

Figure 2:
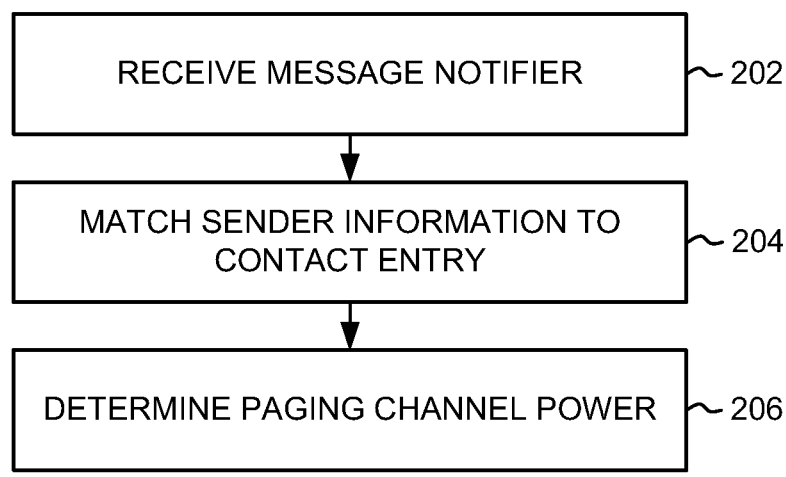
FIG. 2 illustrates an exemplary method of providing a notification message in a wireless communication system.

FIG. 2 illustrates an exemplary method of providing a notification message in a wireless communication system. In operation 202, a message notifier is received at a processing node, such as processing node 108, based on a first message from a sender, such as wireless device 102, to a recipient wireless device, such as wireless device 104. The message notifier can comprise sender information.

In operation 204, the sender information is matched to a contact entry of the recipient to generate a matching criteria. The matching criteria can provide an indication of the priority or importance of the sender, for example, if the sender information can be matched to a contact entry of the recipient. The contact entry can comprise additional information which can be used to generate the matching criteria, which can comprise an indication that the sender information was matched to a contact entry of the recipient wireless device. The matching criteria can also comprise an indication of importance or priority level of the contact entry. For example, a contact entry for a family member, friend, or business contact can comprise an indication of the priority level of the contact entry. As another example, the contact entry can comprise an indication that voice mail from the contact entry should be prioritized, and can also include an indication of a priority level to be ascribed to voice mail associated with the contact entry.

In operation 206, a paging channel power is determined based on the matching criteria for a notification message to be sent to the recipient wireless device. In an embodiment, a notification message, such as a message waiting indicator or a similar indication that a voice mail has been received for wireless device 104, can be sent to wireless device 104 using a power level which is determined based on the matching criteria. For matching criteria which indicate that the voice mail has been received from an important or priority caller, the power level at which the notification message is sent can be increased, to increase the probability that wireless device 104 will receive the notification message.

Figure 3:
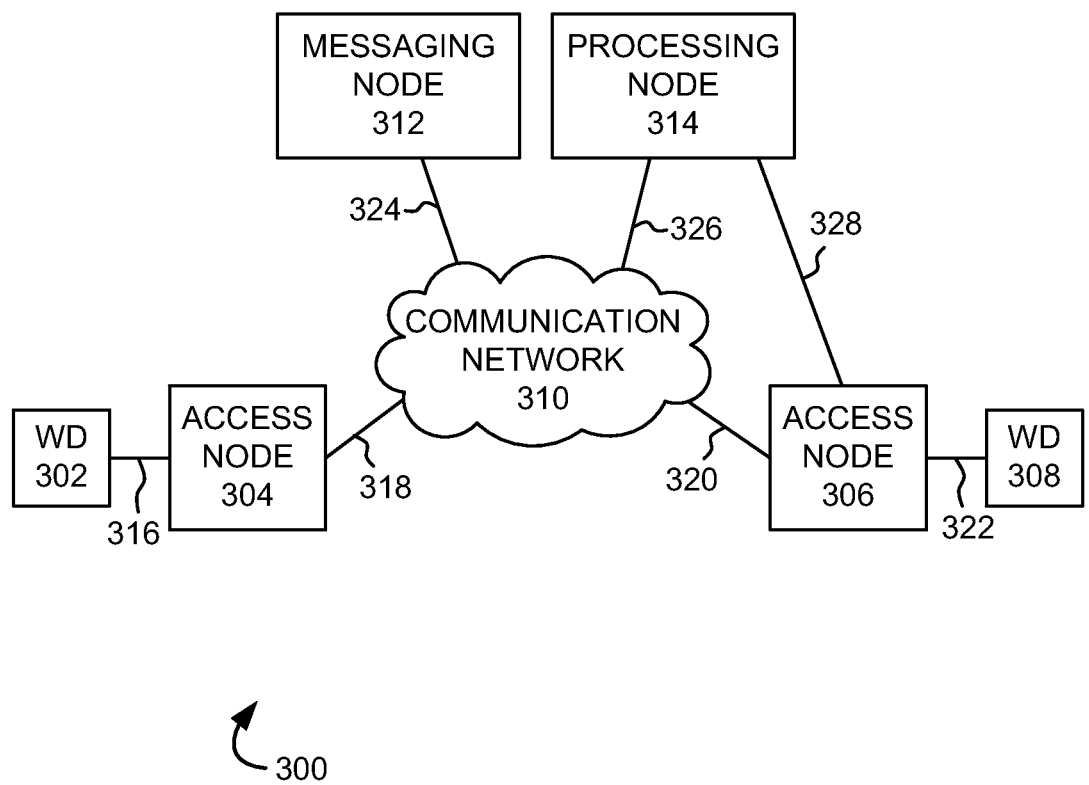
FIG. 3 illustrates another exemplary system for providing a notification message in a wireless communication system.

FIG. 3 illustrates another exemplary system for providing a notification message comprising wireless devices 302 and 308, access nodes 304 and 306, communication network 310, messaging node 312 and processing node 314. Examples of wireless devices 302 and 308 can include a cell phone, a smart phone, a computing platform such as a laptop, palmtop, or tablet, a personal digital assistant, or an internet access device, including combinations thereof. Wireless device 302 is in communication with access node 304 over communication link 316, and wireless device 308 is in communication with access node 306 over communication link 322.

Access nodes 304 and 306 are network elements which can provide wireless communication to wireless devices 302 and 308, respectively. Examples of access nodes 304 and 306 include a base transceiver station, a radio base station, an eNodeB device, or an enhanced eNodeB device. Access node 304 is in communication with communication network 310 over communication link 318, and access node 306 is in communication with communication network 310 over communication link 300. Access node 306 is also in communication with processing node 314 over communication link 328, which can be, for example, a paging communication link.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 is in communication with messaging node 312 over communication link 324 and with processing node 314 over communication link 326.

Messaging node 312 is a network element capable of receiving a message intended for a target wireless device and of providing a message notifier to processing node 314. For example, messaging node 312 can receive and store a voice mail message from wireless device 302 intended for wireless device 308. Messaging node 312 can comprise a processor and associated circuitry to execute or direct the execution of computer-readable instructions to provide a message notifier to processing node 314. Messaging node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Messaging node 312 can comprise, for example, a dedicated network node, or the functionality of messaging node 312 can be included in another network node such as a gateway, a proxy node, or other network node capable of supporting the appropriate functionality. Messaging node 312 can provide the message notifier, for example, to processing node 314 via communication network 310.

Processing node 314 is a network element capable of receiving a message notifier and determining a paging channel power to send a notification message to a recipient wireless device. Processing node 314 can comprise a processor and associated circuitry to execute or direct the execution of computer-readable instructions to determine a paging channel power for a notification message to be sent to the recipient wireless device. Processing node 314 can provide the paging channel power, for example, to access node 306 over communication link 324, which can be a link for communicating paging related information. Processing node 314 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 314 can comprise, for example, a dedicated network node, or the functionality of processing node 314 can be included in another network node such as a gateway, a proxy node, a home location register (HLS), a home subscriber server (HSS), a mobility management entity (MME), or other network node capable of supporting the appropriate functionality. In addition, messaging node 312 and processing node 314 can be independent network nodes, or the functionality of each can be combined in a single network node or network element.

Communication links 316, 318, 320, 322, 324, 326 and 328 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304 and 306, communication network 310, messaging node 312 and processing node 314 which are omitted for clarity, including additional processing nodes, routers, gateways, and physical and/or wireless data links for carrying data among the various network elements.

Figure 4:
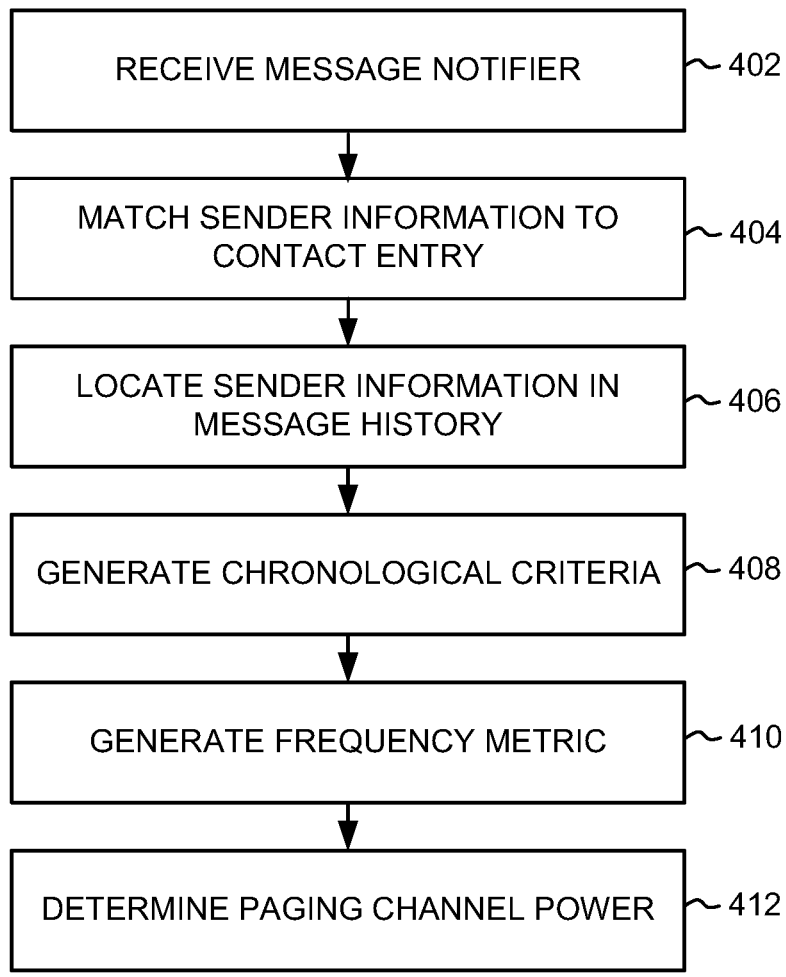
FIG. 4 illustrates another exemplary method of providing a notification message in a wireless communication system.

FIG. 4 illustrates another exemplary method of providing a notification message in a wireless communication system. In operation 402, a message notifier is received. For example, messaging node 312 can send a message notifier to processing node 314 when a voice mail is received from a sending wireless device (such as wireless device 302) for a target wireless device (such as wireless device 308). The message notifer can comprise sender information related to the sender of the voice mail message and/or related to wireless device 302.

In operation 404, the sender information is matched to a contact entry of the recipient wireless device (such as wireless device 308) to generate a matching criteria. In an embodiment, it can be determined whether the sender information can be matched to a contact entry in contact information of wireless device 308. The contact information of wireless device can be stored, for example, in a database in communication with processing node 314.

In operation 406, the sender information is located in a message history of the recipient wireless device (such as wireless device 308) to generate a message history criteria. For example, the wireless device 302 may have previously sent a voice mail to wireless device 308, and in such case an indication of the previously sent voice mail can be present in a message history of wireless device 308. The message history of wireless device 308 can be stored in a database in communication with processing node 314.

In operation 408, a chronological criteria is generated based on a comparison of a first time period and chronological information of the message notifier. That is, the message notifier can further comprise chronological information, and the chronological information can be compared to a first time period to generate a chronological criteria. For example, a first time period can be specified during which voice mail messages are to be given higher priority or greater importance. As one example, a voice mail message received during business hours may be given greater weight or importance. Similarly, a first time period can be specified to decrease the importance or weight associated with voice mail messages received during the specified first time period. Based on the comparison of the chronological information of the message notifier to the first time period, a chronological criteria can be generated.

In operation 410, a frequency metric is generated based on the message history of the recipient and a second time period. For example, multiple voice mail messages received from a sending wireless device within a period of time can indicate that an attempt is being made to reach wireless device 308 with a greater than normal degree of urgency. A second period of time can be determined, for example, 48 hours, or 1 week, which can be considered together with the message history of the recipient device 308. When a plurality of messages are received from a sending wireless device 302 during the second time period, each successive voice mail message can be assigned or ascribed a greater important or priority. Thus, a frequency metric can be generated based on the message history of the recipient and the second time period.

In operation 412, a paging channel power can be determined based on at least one of the matching criteria, the message history criteria, the chronological criteria, and the frequency metric for a notification message to be sent to the recipient wireless device. For example, based on at least one of the matching criteria, the message history criteria, the chronological criteria, and the frequency metric, a paging channel power can be determined for a notification message to be sent to wireless device 308.

Figure 5:
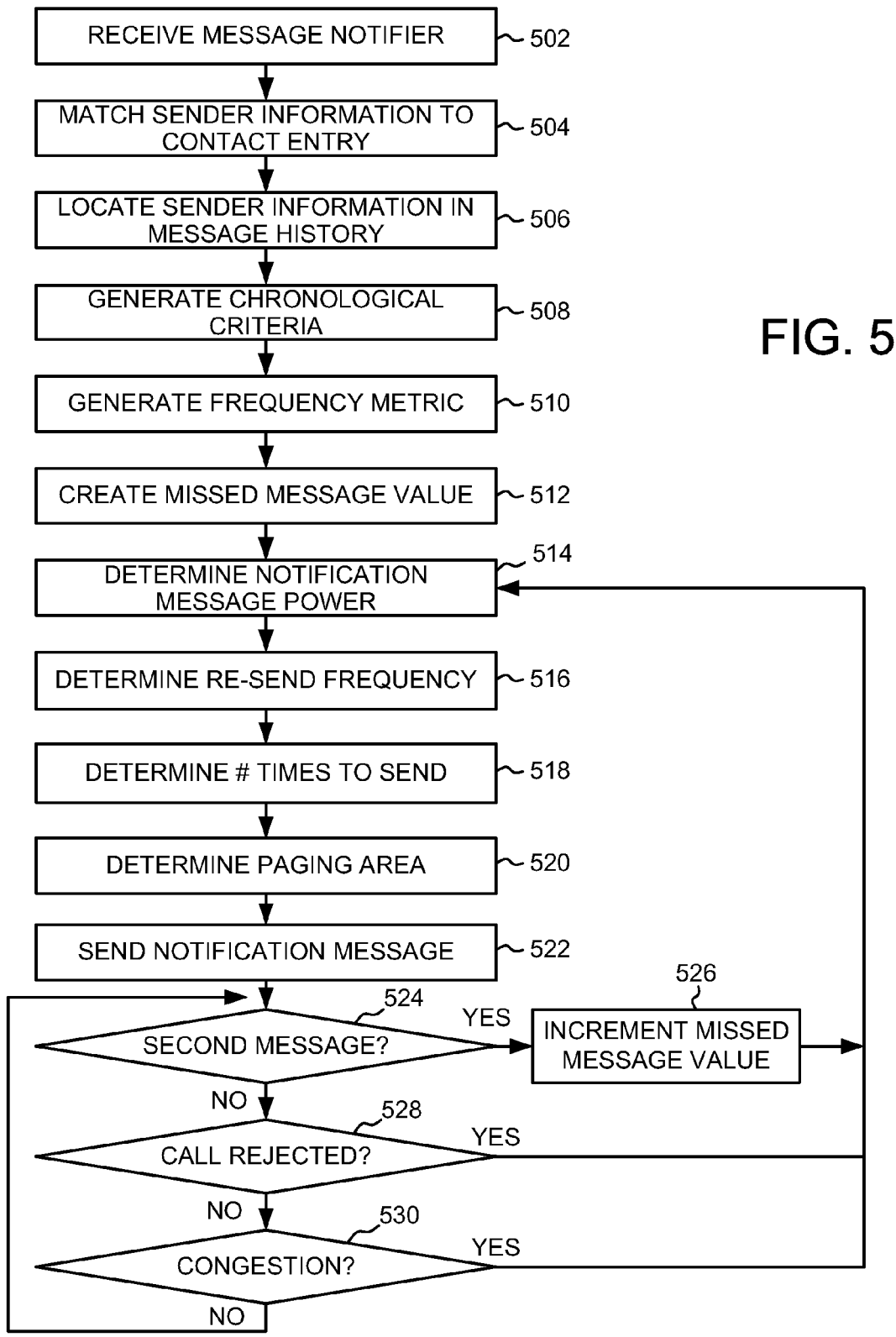
FIG. 5 illustrates another exemplary method of providing a notification message in a wireless communication system.

FIG. 5 illustrates another exemplary method of providing a notification message in a wireless communication system. In operation 502, a message notifier is received. For example, a message notifier can be received at processing node 314. The message notifier can be sent by messaging node 312 to notify processing node 314 that a voice mail has been received for target wireless device 308. The message notifier can comprise sender information about the wireless device which sent the voice mail, such as wireless device 302.

In operation 504, the sender information is matched to a contact entry of the target wireless device (such as wireless device 308) to generate a matching criteria. In an embodiment, it can be determined whether the sender information can be matched to a contact entry in contact information of wireless device 308. The contact information of wireless device can be stored, for example, in a database in communication with processing node 314.

In operation 506, the sender information is located in a message history of the target wireless device (such as wireless device 308) to generate a message history critieria. For example, the wireless device 302 may have previously sent a voice mail to wireless device 308, and in such case an indication of the previously sent voice mail can be present in a message history of wireless device 308. The message history of wireless device 308 can be stored in a database in communication with processing node 314.

In operation 508, a chronological criteria is generated based on a comparison of a first time period and chronological information of the message notifier. That is, the message notifier can further comprise chronological information, and the chronological information can be compared to a first time period to generate a chronological criteria. For example, a first time period can be specified during which voice mail messages are to be given higher priority or greater importance. As one example, a voice mail message received during business hours may be given greater weight or importance. Similarly, a first time period can be specified to decrease the importance or weight associated with voice mail messages received during the specified first time period. Based on the comparison of the chronological information of the message notifier to the first time period, a chronological criteria can be generated.

In operation 510, a frequency metric is generated based on the message history of the recipient and a second time period. For example, multiple voice mail messages received from a sending wireless device within a period of time can indicate that an attempt is being made to reach wireless device 308 with a greater than normal degree of urgency. A second period of time can be determined, for example, 48 hours, or 1 week, which can be considered together with the message history of the recipient device 308. When a plurality of messages are received from a sending wireless device 302 during the second time period, each successive voice mail message can be assigned or ascribed a greater important or priority. Thus, a frequency metric can be generated based on the message history of the recipient and the second time period.

In operation 512, a missed message value can be created, and the missed message value can be associated with the notification message. The missed message value can provide an indication that the recipient wireless device 308 has sent a message in response to the voice mail sent by the sender wireless device 302. The initial value of the missed message value can indicate that recipient wireless device 308 has not responded. The missed message value is further described below.

In operation 514, a paging channel power can be determined based on at least one of the matching criteria, the message history criteria, the chronological criteria, the frequency metric, and the missed message value for a notification message to be sent to the recipient wireless device. For example, based on at least one of the matching criteria, the message history criteria, the chronological criteria, the frequency metric, and the missed message value, a paging channel power can be determined for a notification message to be sent to wireless device 308.

In operation 516, a re-send frequency is determined, which can indicate a frequency at which the notification message will be re-sent to the recipient wireless device. For example, recipient wireless device 308 may not respond to a first notification message, and in such case the notification message may be re-sent to wireless device 308. Re-sending the notification message uses network resources, and thus a frequency at which the notification message will be re-sent can be determined. In an embodiment, the re-send frequency can be based on the matching criteria, so that the sender information of the message notifier can cause the re-send frequency to be increased or decreased. The re-send frequency can be, for example, a time interval, such as 30 second, 1 minute, 5 minutes, and the like, after which the notification message can be re-sent to recipient wireless device 308.

In operation 518, a number of times which the notification message is re-sent is determined, which can indicate a total number of times which the notification message will be sent (and re-sent) to the recipient wireless device. For example, recipient wireless device 308 may not respond to a first notification message, and in such case the notification message may be re-sent to wireless device 308 up to a determined number of times. In an embodiment, the number of times which the notification message is re-sent can be based on the matching criteria, so that the sender information of the message notifier can cause the number of times to be increased or decreased.

In operation 520, a paging area to which the notification message is sent can be determined. The paging area comprises at least one access node to which the notification message is sent. The paging area can comprise a last access node with which the recipient wireless device 308 was in communication (for example, if the wireless device 308 has entered lower power or "idle" mode). The paging area can also comprise a group of access nodes, such as a tracking area, or a subset of a tracking area. The paging area can also comprise tracking areas on a tracking area list (that is, a group of tracking areas proximate or adjacent to a tracking area of the last access node with which the recipient wireless device 308 was in communication). In an embodiment, the paging area can be based on the matching criteria, so that the sender information of the message notifier can cause the paging area to be increased or decreased.

In operation 522, a notification message is sent to the recipient wireless device, such as wireless device 308. The notification message can be sent to wireless device 308 according to at least one of the determined re-send frequency, the determined number of times to send the notification message, and the determined paging area.

In operation 524, it is determined whether the recipient wireless device has sent a second message in response to the notification message. For example, recipient wireless device 308 may receive the notification message, and may attempt to contact sender wireless device 302. When sender wireless device 302 does not respond to the attempted contact, wireless device 308 may send a message such as voice mail for wireless device 302 (operation 524—YES), and the missed message value may be incremented to indicate that the recipient wireless device 308 has responded to the notification message (operation 526). In an embodiment, the incremented missed message value can be used to increase the notification message power of a subsequent notification message sent to wireless device 308 based on a new voice mail send by sender wireless device responsive to the message send by wireless device 308. Thus, repeated missed messages (sometimes referred to colloquially as "phone tag" and the like) can cause the notification message power to be increased for subsequent notification messages.

In operation 528, a call-rejected indication is determined. In certain circumstances, recipient wireless device 308 can be aware that wireless device 302 is placing a call to wireless device 308, such by receipt of a call notification. Recipient wireless device 308 may elect not to take the call, and wireless device 308 can send a call-rejected indication to indicate the call rejection. The call-rejected indication can be a simple indication that wireless device 308 rejects the incoming call. The call-rejected indication can be sent by wireless device 308 to processing node 314 via access node 306. The call-rejected indication can also be conditional or include additional information. For example, in addition to the incoming call notification, wireless device 308 may receive an indication of who is calling, and wireless device 308 may send a call-rejected indication for the incoming call together with an indication the caller is an important or priority caller. Thus, wireless device 308 can provide a call-rejected indication which comprises an indication of a priority of wireless device 302 (operation 528—YES), and the call-rejected indication can be used to adjust the paging channel power in operation 514.

In operation 530, it can be determined whether there is network congestion which may affect the ability of wireless device 308 to receive the notification message. For example, the message notifier can include an indication of network congestion. As another example, processing node 314 can determine that there is network congestion which affects wireless device 308, based on, for example, a message from wireless device 308, or an indication of network congestion from access node 306, or from a network element such as a mobility management entity (MME) or another network element. When an indication of network congestion is received (operation 530—YES), the paging channel power can be adjusted accordingly.

Returning to operation 514, a notification message power can be determined for a second message notifier to be sent to wireless device 308. The notification message power of the second message notifier can be based on at least one of whether the recipient wireless device has sent a second message in response to the notification message, the call-rejected indication, and the indication of network congestion.

Figure 6:
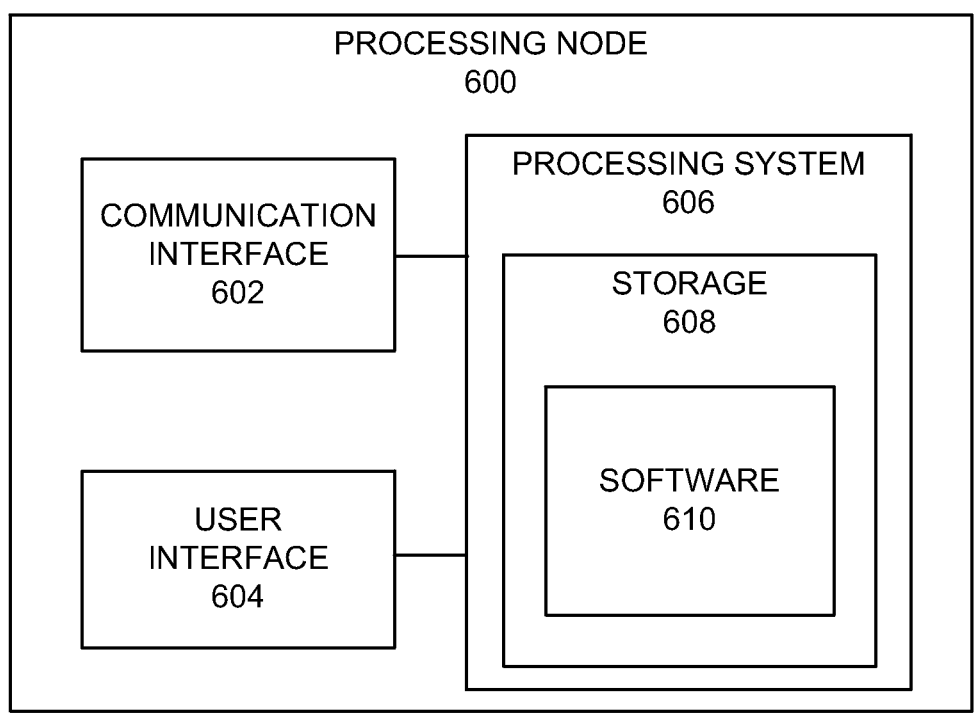
FIG. 6 illustrates an exemplary processing node.

FIG. 6 illustrates an exemplary processing node comprises communication interface 602, user interface 604, and processing system 606 in communication with communication interface 602 and user interface 604. Processing node 600 is capable of detecting unauthorized tethering by a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 602 to communicate with other network elements. User interface 604 permits the configuration and control of the operation of processing node 600.

Examples of processing node 600 include processing node 108 and processing node 304. Processing node can also be an adjunct or component of a network element, such as an element of access node 304 or 306, or of another network element. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing a notification message in a wireless communication system, comprising:
   receiving at a processing node in a wireless communication system a message notifier based on a first message from a sender to a recipient wireless device, the message notifier comprising sender information;
   creating a missed message value associated with the notification message;
   matching the sender information to a contact entry of the recipient to generate a matching criteria;
   determining a paging channel power based on the matching criteria for the notification message to be sent to the recipient wireless device;
   incrementing the missed message value when the recipient wireless device sends a second message to the sender based on the first message wherein the sender does not respond to the second message; and
   determining the paging channel power based on the missed message value for a second notification message to be provided to the recipient wireless device when the network node receives a second message notifier based on a third message from the sender to the recipient wireless device.

2. The method of claim 1, wherein the message notifier further comprises chronological information, and wherein the method further comprises:
   locating the sender information in a received message history of the recipient to generate a message history criteria;
   comparing the chronological information to a first time period to generate a chronological criteria;
   generating a frequency metric based on the message history of the recipient and a second time period; and
   determining a paging channel power for a notification message to be sent to the recipient wireless device based on at least one of the matching criteria, the message history criteria, the chronological criteria, and the frequency metric.

3. The method of claim 1, further comprising:
   determining a frequency at which the notification message is re-sent based on the matching criteria.

4. The method of claim 1, further comprising:
   determining a number of times which the notification message is re-sent based on the matching criteria.

5. The method of claim 1, further comprising:
   receiving a call-rejected indication from the recipient wireless device and adjusting the paging channel power based on the call-rejected indication.

6. The method of claim 1, further comprising:
   adjusting the paging channel power based on an indication of network congestion.

7. The method of claim 1, further comprising:
   determining a paging area to which the notification message is broadcast based on the matching criteria.

8. A processing node comprising a processing system and a communications interface in a wireless communication system, configured to:
   receive at a network node in a wireless communication system a message notifier based on a first message from a sender to a recipient wireless device, the message notifier comprising sender information;

create a missed message value associated with the notification message;

match the sender information to a contact entry of the recipient to generate a matching criteria;

determine a paging channel power based on the matching criteria for a notification message to be sent to recipient wireless device;

increment the missed message value when the recipient wireless device sends a second message to the sender based on the first message wherein the sender does not respond to the second message; and determine the paging channel power based on the missed message value for a second notification message to be provided to the recipient wireless device when the network node receives a second message notifier based on a third message from the sender to the recipient wireless device.

9. The processing node of claim 8, wherein the message notifier further comprises chronological information, the processing node further configured to:

locate the sender information in a received message history of the recipient to generate a message history criteria;

compare the chronological information to a first time period to generate a chronological criteria;

generate a frequency metric based on the message history of the recipient and a second time period; and determine a paging channel power for a notification message to be sent to the recipient wireless device based on at least one of the matching criteria, the message history criteria, the chronological criteria, and the frequency metric.

10. The processing node of claim 8, further configured to:

determine a frequency at which the notification message is re-sent based on the matching criteria.

11. The processing node of claim 8, further configured to:

determine a number of times which the notification message is re-sent based on the matching criteria.

12. The processing node of claim 8, further configured to:

receive a message-rejected indication from the recipient wireless device and adjusting the paging channel power based on the message-rejected indication.

13. The processing node of claim 8, further configured to:

adjust the paging channel power based on an indication in the message notifier of network congestion.

14. The processing node of claim 8, further configured to:

determine a paging area to which the notification message is broadcast based on the matching criteria.

15. A method of providing a notification message in a wireless communication system, comprising:

receiving at a network node in a wireless communication system a message notifier based on a first message from a sender to a recipient wireless device, the message notifier comprising sender information and chronological information;

creating a missed message value associated with the notification message;

matching the sender information to a contact entry of the recipient to generate a matching criteria;

locating the sender information in a received message history of the recipient to generate a message history criteria;

comparing the chronological information to a first time period to generate a chronological criteria;

generating a frequency metric based on the message history of the recipient and a second time period;

determining a paging channel power for a notification message to be sent to the recipient wireless device based on at least one of the matching criteria, the message history criteria, the chronological criteria, and the frequency metric;

incrementing the missed message value when the recipient wireless device sends a second message to the sender based on the first message wherein the sender does not respond to the second message; and determining the paging channel power based on the missed message value for a second notification message to be provided to the recipient wireless device when the network node receives a second message notifier based on a third message from the sender to the recipient wireless device.

* * * * *